UNITED STATES PATENT OFFICE.

EDWIN BRANDENBERGER, OF THAON-LES-VOSGES, FRANCE.

PROCESS FOR THE CONTINUOUS MANUFACTURE OF CELLULOSE FILMS.

981,368. Specification of Letters Patent. Patented Jan. 10, 1911.

No Drawing. Application filed July 23, 1909. Serial No. 509,190.

*To all whom it may concern:*

Be it known that I, EDWIN BRANDENBERGER, a citizen of the Swiss Republic, and resident of Thaon-les-Vosges, Vosges, France, have invented a new and useful Improvement in Processes for the Continuous Manufacture of Cellulose Films, which improvement is fully set forth in the following specification.

This invention relates to a process by means of which it is possible to obtain in a continuous manner films of an indefinite length, starting direct from a water solution of cellulose, more particularly from a solution of cellulose xanthate.

The process is characterized by the immediate coagulation of the cellulose water solution on its coming out from a distributing hopper, by means for instance of a concentrated water solution of sulfate of ammonia or of other suitable salts; the film thus formed by coagulation, being immediately treated, for the purpose on the one hand, of removing all the impurities formed, more particularly sulfids and polysulfids and on the other hand of rendering the said film insoluble in water, the film thus rendered insoluble being finally washed in cold and in hot water.

For carrying out the above process in practice, the cellulose water solution is distributed in the shape of a layer by means of a suitable hopper. It is immediately coagulated by a concentrated water solution of sulfate of ammonia or of other suitable salts. The cellulose layer or sheet is immediately converted into a cellulose film covered with impurities and still soluble in water.

On coming out from the bath of sulfate of ammonia, the cellulose film is brought immediately, without any long contact with the air, into a bath formed by a concentrated or non-concentrate water solution of sodium chlorid or of ordinary sea salt. The impurities contained in the film, more particularly sulfids and polysulfids are dissolved in the said water in which they are consequently retained. Thence, and without the film undergoing a long contact with the air, it is introduced into a third bath formed by a mineral acid for instance sulfuric or hydrochloric acid diluted with water. The concentration of this bath will vary from 5% to 40% acid in accordance with the duration of the time during which the film is kept in it, its thickness and temperature. In contact with the mineral acid, cellulose xanthate of sodium, if a solution of viscose be used in the beginning, is decomposed and cellulose insoluble in water, is formed. On coming out from the acid bath, the cellulose film is washed in cold water and in hot water.

It is obvious that, according to the method used, it is possible to use several baths of each re-agent, instead of one single bath, according to the speed of the film in the bath, to the thickness of the said film and to the temperature.

Claims.

1. A process for the continuous manufacture of cellulose films, consisting in introducing a layer or sheet of water solution of cellulose into a water solution of a salt bringing about the coagulation of the said layer; in immediately introducing the film thus coagulated into a bath formed by a solution of a salt capable of keeping back the impurities of the film, the said treatment being immediately followed by the immersion of the film into a bath formed by a mineral acid, for the purpose of rendering the cellulose film insoluble in water by the decomposition of the cellulose salt; the operation being terminated by washing in cold and in hot water.

2. A process for the continuous manufacture of cellulose films obtained from water solutions of cellulose, more particularly from solutions of cellulose xanthate, consisting in introducing a layer of water solution of cellulose into a water solution of a salt producing the coagulation of the layer, in immediately introducing the film thus coagulated into a bath formed by a water solution of sodium chlorid in order to remove the impurities, the said treatment being immediately followed by the immersion of the film into a bath formed by a mineral acid, for the purpose of rendering the cellulose film insoluble in water by the decomposition of the cellulose salt, the operation being terminated by washing in cold and in hot water.

3. A process for the continuous manufacture of cellulose films obtained from water solution of cellulose, more particularly from solutions of cellulose xanthate, consisting in introducing a layer of water solution of cellulose into a concentrated water solution of sulfate of ammonia, for the purpose of bringing about the coagulation of the layer; in immediately introducing the film thus coagulated into a bath formed by a water solution of sodium chlorid for removing the impurities, the treatment in question being immediately followed by the immersion of the film into a bath formed by a mineral acid, for the purpose of rendering the cellulose film insoluble in water by the decomposition of the cellulose salt, the operation terminating in washing in cold and in hot water.

4. A process for the continuous manufacture of cellulose films consisting in introducing a layer of a water solution of cellulose xanthate into a bath of a concentrated water solution of sulfate of ammonia and permitting said layer to remain in said bath several minutes only, whereby said layer is coagulated into a film soluble in water, but prevented from conversion into cellulose, then immediately introducing the film into a bath of water solution of sodium chlorid and dissolving out the impurities contained in said film, then introducing said film into a bath of mineral acid, thus converting the coagulated film soluble in water into cellulose insoluble in water, and finally washing the film in cold and in hot water.

In testimony whereof I have signed this specification in the presence of two subscribing witnesses.

EDWIN BRANDENBERGER.

Witnesses:
 EMILE LEDRET,
 H. C. COXE.